US008272645B2

(12) United States Patent
Kondo et al.

(10) Patent No.: US 8,272,645 B2
(45) Date of Patent: Sep. 25, 2012

(54) TOOL REPLACING DEVICE

(75) Inventors: Makoto Kondo, Fujisawa (JP); Tatsuji Minato, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 899 days.

(21) Appl. No.: 12/368,428

(22) Filed: Feb. 10, 2009

(65) Prior Publication Data

US 2009/0253563 A1  Oct. 8, 2009

(30) Foreign Application Priority Data

Apr. 8, 2008  (JP) .................................. 2008-100239

(51) Int. Cl.
*B23B 31/30* (2006.01)

(52) U.S. Cl. .......... 279/4.02; 483/901; 279/4.1; 279/75; 279/126

(58) Field of Classification Search ................. 279/4.01, 279/4.02, 4.04, 4.1, 4.12, 30, 74, 75, 82, 279/22, 125, 126, 157; 483/901, 2–16; 901/46, 901/49, 42
See application file for complete search history.

(56) References Cited

U.S. PATENT DOCUMENTS

| 4,389,561 | A | * | 6/1983 | Weman et al. ............ 219/124.34 |
| 4,514,616 | A | * | 4/1985 | Warner ......................... 219/136 |
| 4,815,780 | A | * | 3/1989 | Obrist ........................... 294/86.4 |
| 4,855,558 | A | * | 8/1989 | Ramsbro ..................... 219/69.15 |
| 5,906,378 | A | * | 5/1999 | Nordquist ..................... 279/4.06 |
| 5,909,882 | A | * | 6/1999 | Schill ............................. 279/4.04 |
| 6,160,236 | A | * | 12/2000 | Nordquist ................... 219/69.15 |
| 6,563,084 | B1 | * | 5/2003 | Bandy et al. ............. 219/124.34 |
| 7,002,102 | B2 | * | 2/2006 | Munch et al. ............ 219/124.34 |

FOREIGN PATENT DOCUMENTS

| JP | 5-192890 | 8/1993 |
| JP | 9-330125 | 12/1997 |
| JP | 2003-117868 | 4/2003 |

* cited by examiner

*Primary Examiner* — Daniel Howell
*Assistant Examiner* — Paul M Janeski
(74) *Attorney, Agent, or Firm* — Oblon, Spivak, McClelland, Maier & Neustadt, L.L.P.

(57) ABSTRACT

A tool replacing device including a case member is disclosed. In the case member, engaging balls supported between a holding member and a movable member is projected into the holding member by an extruding surface of the movable member, resiliently urged by a second spring, thereby allowing a tool to be engaged. By pressing the movable member against a resilient urging force of the second spring, the engaging balls can be moved in the movable member. Also, since there are provided shock sensors for detecting a moving distance of the holding member holding the tool, collision or the like of the tool can be detected. Even if power supply is stopped, the present tool replacing device can hold the tool.

4 Claims, 8 Drawing Sheets

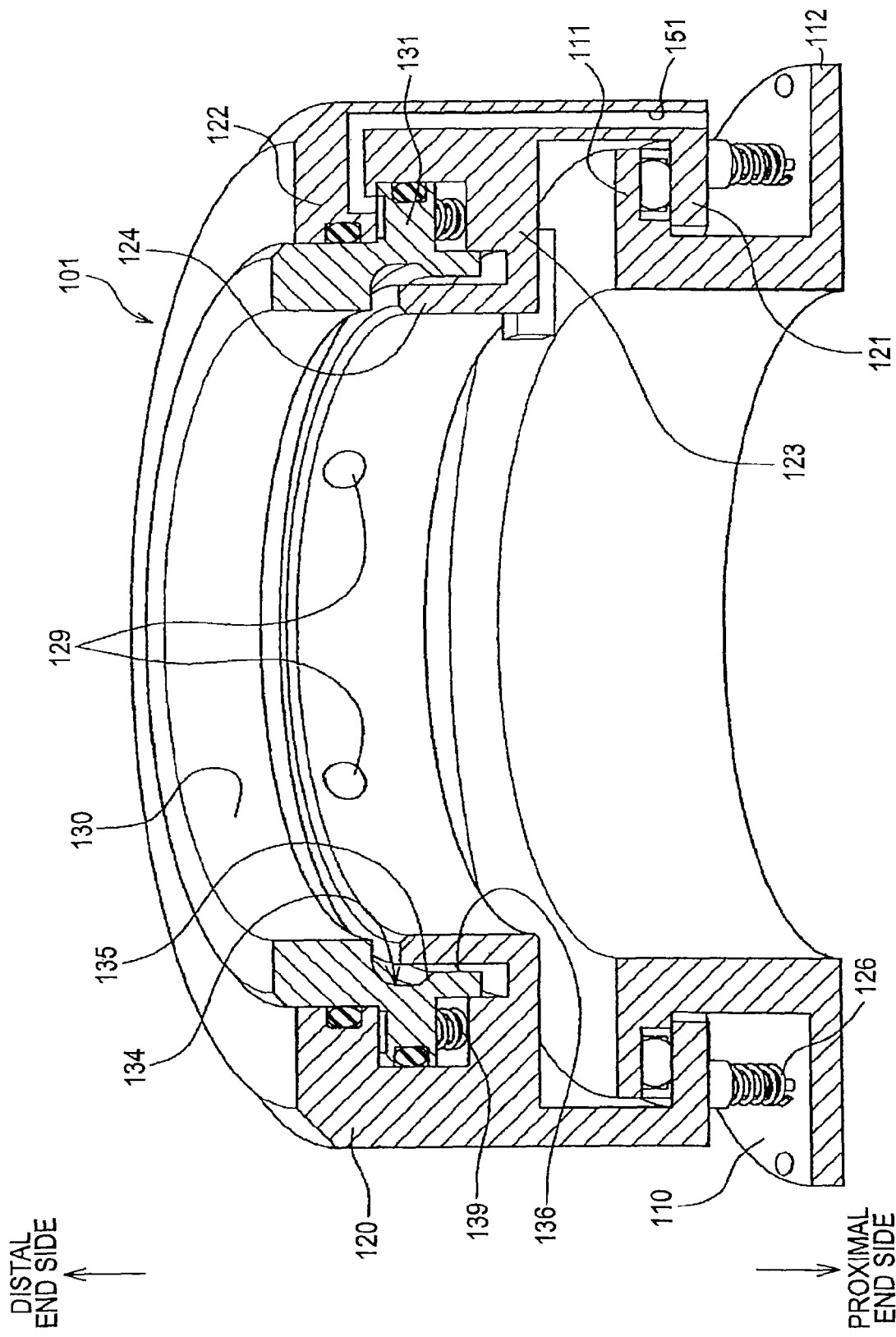

TOOL REPLACING DEVICE

BACKGROUND OF THE INVENTION

1. Field of the Invention

The present invention relates to a tool replacing device to be mounted to an industrial robot device, and more specifically, to a hollow shaped (cylindrical) tool replacing device equipped with shock censors.

2. Description of the Related Art

In an industrial robot device for use in welding/cutting, operations such as welding and cutting are performed, with various tools such as a welding torch and a cutting tool mounted to a tool holder located at the tip portion of a robot arm.

Welding/cutting operation by the industrial robot device, however, involves a problem of causing a failure of the welding torch or of imposing load on the robot device because a tool make contact with, or collide against an object to be operated.

Furthermore, for example, as disclosed in Japanese Unexamined Patent Application Publication No. 5-192890, the contact/collision of the tool not only cause damage to the welding torch, but also raises a problem that the tool which has been mounted to the tool holder upon being positioned in a mounting position relative to the tool holder deviates from the mounting position.

The deviation of the mounting position of the tool does not allow an accurate operation to be performed, resulting in a troublesomeness of interrupting the operation to again perform positioning for mounting. Moreover, regarding mounting work, because the tool is fixed to the tool holder with bolts or the like, the mounting/demounting of the tool cannot be easily performed.

Regarding the above-described contact/collision problem of the tool, there has been known arrangements for achieving an improvement by detecting the contact/collision of the tool usually by mounting a shock sensor(s) at the tip portion of the robot arm.

Furthermore, in order to prevent deviation of the mounting position of the tool due to contact or collision, Japanese Unexamined Patent Application Publication No. 9-330125 discloses a tool holder that accommodates/corrects an error in position or inclination even if the tool makes contact with an object to be operated, by providing a plurality of springs to the tool holder to which the welding torch or the like is connected.

On the other hand, in order to facilitate mounting/demounting of the tool, Japanese Unexamined Patent Application Publication No. 2003-117868 discloses a holder employing a pressurized air for the mounting of the tool.

Meanwhile, the tool such as a welding torch or the like mounted to the robot arm is high in weight, and therefore, in order to accurately move the welding torch or the like up to a position to be moved, it is desirable that the welding torch or the like be arranged on an axial line in the longitudinal direction of the robot arm.

However, according to the above-described Japanese Unexamined Patent Application Publication No. 9-330125, because the above-described holder has therein springs for accommodating errors in position and inclination, the tool cannot be held by being inserting into the holder, that is, the tool cannot be accommodated within the robot arm and hence it must be held outside the robot arm.

As a result, the tool cannot be arranged on the axial line in the longitudinal direction of the robot arm, which raises the issue of impairing the accuracy of the robot arm's operation of moving the tool such as the welding torch.

Moreover, the above-described problem that the mounting/demounting is troublesome because the tool is fixed by screws or bolts, has not yet been settled.

According to the Japanese Unexamined Patent Application Publication No. 2003-117868, the tool is held by engaging a ball (refer to a "ball 47" in FIG. 1) with a tool plate (refer to a "tool plate 30" in FIG. 1) by pressurization using air, and therefore, if power supply is interrupted by an electric outage or the like, supply of the pressurized air is stopped, so that the tool plate and the ball is disengaged and the welding torch or the like ends up falling off the tool holder.

Also, according to the Japanese Unexamined Patent Application Publication No. 2003-117868, even though a fail-safe mechanism is provided as a countermeasure against the falling-off of the welding torch or the like from the tool holder, if pressurization by air is stopped, the ball and the tool plate do not engage with each other, which cannot solve the problem that the welding torch or the like deviates from the tool holder's mounting position that has been positioned.

Meanwhile, among conventional hollow-shaped holders, there has been no holder equipped with a shock sensor.

SUMMARY OF THE INVENTION

In view of the above-described problems, the present invention is directed a tool replacing device that is capable of detecting collision or the like of the tool and holding the tool even if the power supply is interrupted, and that allows facilitation of the mounting/demounting of the tool and enhancement of the accuracy of the robot arm's operation of moving the tool.

To solve the above-described problems, the present invention, in a first aspect, provides a tool replacing device wherein a mounting hole for the tool is provided on its distal end side from which the tool is inserted, and wherein its proximal end side is mounted to a tip portion of a robot arm, the tool replacing device comprising: a substantially cylindrical case member having a first extension portion, a second extension portion, and a third extension portion that extend toward an inner diameter side of the tool replacing device, and that are located on the distal end side, the proximal end side, and between the distal end side and the proximal end side, respectively; a substantially cylindrical holding member located inside the case member, and having a fourth extension portion that extends toward an inner peripheral surface of the case member between the second extension portion and the third extension portion; and a substantially cylindrical movable member located on the distal side of the holding member, and supported between the holding member and the case member, the movable member having a fifth extension portion extending toward the inner peripheral surface of the case member between the first extension portion and the third extension portion, wherein the case member supports the holding member between the second extension portion and the fourth extension portion via a first elastic member so as to be movable in a cylindrical axis direction of the case member, and supports the movable member so as to be movable in the cylindrical axis direction of the case member, between the third extension portion and the fifth extension portion via a second elastic member, the case member including: a shock sensor that is located at an end face on the proximal end side of the third extension portion, and that detects a movement of the holding member by abutting against the fourth extension portion; and a fluid supply hole for supplying a fluid to an end face on the distal end side of the fifth extension portion, and moving the movable member toward a direction opposite to a direction of a resilient urging force of the second elastic member, the fluid supply hole being located at an end face on the proximal end side of the first extension portion; wherein the holding member includes a projection hole formed so that an engaging ball held between the movable member and the holding member is projectable toward an inner peripheral surface side of the holding member; and wherein the movable member includes: an extruding surface that projects the engaging ball from the projection hole toward the inner peripheral surface side of the holding member by the end face on the distal end side of the fifth extension portion resiliently urged by the second elastic member abutting against an inner peripheral surface of the movable member, opposite to the engaging ball when the end face on the distal end side of the fifth extension portion abuts against the end face on the proximal end side of the first extension portion; and a groove portion for accommodating the engaging ball that has moved from the projection hole to the inner peripheral side of the movable member when the fifth extension portion has been pressed against the resilient urging force of the second elastic member by the fluid supplied through the fluid supply hole and the movable member has moved to the proximal end side, the groove portion being located in the inner peripheral surface of the movable member, opposite to the engaging ball.

The above-described features of the present invention allows the tool to be held by the tool replacing device by inserting the tool such as the welding torch into the holding member located in the case member and engaging engaged portions of the tool and the engaging balls projecting into the holding member.

Therefore, the tool held by the tool replacing device is located on the axial line in the longitudinal direction of the robot arm, thus allowing solving the problem of impairing the accuracy of operation of the robot arm.

Furthermore, according to the described features of the present invention, the shock sensor arranged in the case member abuts against the holding member, and therefore, when the holding member for holding the tool moves toward the proximal end side due to the tool's contact with an external member, the shock sensor can detect the tool's contact with the external member by detecting the movement of the holding member.

Furthermore, according to the described features of the present invention, the projecting surface of the movable member is pressing the engaging ball member so that the engaged portion of the tool and the engaging ball may engage with each other, and therefore, even if power supply is stopped, the tool can be held in the holding member, as well as there occurs no problem that the mounting position of the tool deviates. Also, when the tool is to be removed, merely pressurizing the movable member by a fluid against the resilient urging force of the second spring allows the engaging ball to move outside the holding member to thereby bring the tool into a removable state, thus facilitating the mounting/demounting of the tool.

To solve the above-described problems, the present invention, in a second aspect, provides a tool replacing device wherein a mounting hole for the tool is provided on its distal end side from which the tool is inserted, and wherein its proximal end side is mounted to a tip portion of a robot arm, the tool replacing device comprising: a substantially cylindrical case member having a first extension portion and a second extension portion that extend toward an outer diameter direction of the tool replacing device, and that are located on the distal end side and the proximal end side, respectively; a substantially cylindrical holding member located on a distal end side of the case member, the holding member including: a third extension portion of which a proximal end side extends toward an inner diameter side of the tool replacing device, and which is located between the first extension portion and the second extension portion of the case member; a fourth extension portion of which a distal end side extends toward the inner diameter side; a fifth extension portion extending toward the inner diameter side, between the third extension portion and the fourth extension portion; and a movable member located inside the holding member, and having a sixth extension portion that extends toward an outer diameter side of the tool replacing device, between its distal end side and proximal end side, and that is located between the fourth extension portion and the fifth extension portion, wherein the case member supports the holding member between the second extension portion and the third extension portion via a first elastic member so as to be movable in a cylindrical axis direction of the case member, and has a shock sensor that is located at an end face on the distal end side of the second extension portion and that detects a movement of the holding member by abutting against an end face on the proximal end side of the third extension portion of the holding member moving in the cylindrical axis direction; wherein the holding member supports the movable member between the fifth extension portion and the sixth extension portion via a second elastic member so as to be movable in the cylindrical axis direction of the holding member, the holding member includes: a fluid supply hole for supplying a fluid to an end face on the distal end side of the sixth extension portion, and moving the movable member toward a direction opposite to a direction of a resilient urging force of the second elastic member, the fluid supply hole being located at an end face on the proximal end side of the fourth extension portion; a seventh extension portion extending from an end face on the inner diameter side of the fifth extension portion toward the distal end side; and a projection hole formed so that an engaging ball held between the movable member and the holding member is projectable toward an inner peripheral surface side of the holding member; and wherein the movable member includes: an extruding surface that projects the engaging ball from the projection hole toward the inner peripheral surface side of the holding member by the end face on the distal end side of the sixth extension portion resiliently urged by the second elastic member abutting against the inner peripheral surface of the movable member, opposite to the engaging ball when the end face on the distal end side of the sixth extension portion abuts against the end face on the proximal end side of the fourth extension portion; and a groove portion for accommodating the engaging ball that has moved from the projection hole to the inner peripheral side of the movable member when the sixth extension portion has been pressed against the resilient urging force of the second elastic member by the fluid supplied through the fluid supply hole and the movable member has moved to the proximal end side, the groove portion being located in the inner peripheral surface of the movable member, opposite to the engaging ball.

The above-described features of the present invention allows the tool to be held by the tool replacing device by inserting the tool such as the welding torch into the holding member located on the distal end side of the case member, and engaging engaged portion of the tool and the engaging ball projecting into the holding member.

Therefore, the tool held by the tool replacing device is located on the axial line in the longitudinal direction of the robot arm, thus allowing solving the problem of impairing the accuracy of operation of the robot arm.

Furthermore, according to the described features of the present invention, since the shock sensor is arranged between the case member and the holding member, when the holding member for holding the tool moves toward the proximal end side due to the tool's contact with an external member, the shock sensor can detect the tool's contact with the external member by detecting the movement of the holding member.

Moreover, according to the described features of the present invention, the projecting surface of the movable member is pressing the engaging ball member so that the engaged portion of the tool and the engaging balls may engage with each other, and therefore, even if power supply is stopped, the tool can be held, as well as there occurs no problem that the mounting position of the tool deviates. Also, when the tool is to be removed, merely pressurizing the movable member by a fluid against the resilient urging force of the second spring allows the engaging ball to move outside the holding member to thereby bring the tool into a removable state, thus facilitating the mounting/demounting of the tool.

In the tool replacing device according to first and second aspects of the present invention, the first elastic member and the second elastic member are each a spring, and these springs may be arranged along the circumferential direction of the case member at a determined spacing.

In the tool replacing device with the above-described features, the tool can be engaged by using resiliently urging forces of springs, serving as mechanical forces.

The tool replacing device in the present invention is capable of detecting collision or the like of the tool and holding the tool even if the power supply is interrupted, and allows facilitation of the mounting/demounting of the tool and enhancement of the accuracy of the robot arm's operation of moving the tool.

BRIEF DESCRIPTION OF THE DRAWINGS

FIG. 8 is a sectional view of a tool replacing device according to a modification of the present invention.

DESCRIPTION OF THE PREFERRED EMBODIMENTS

Figure 1:
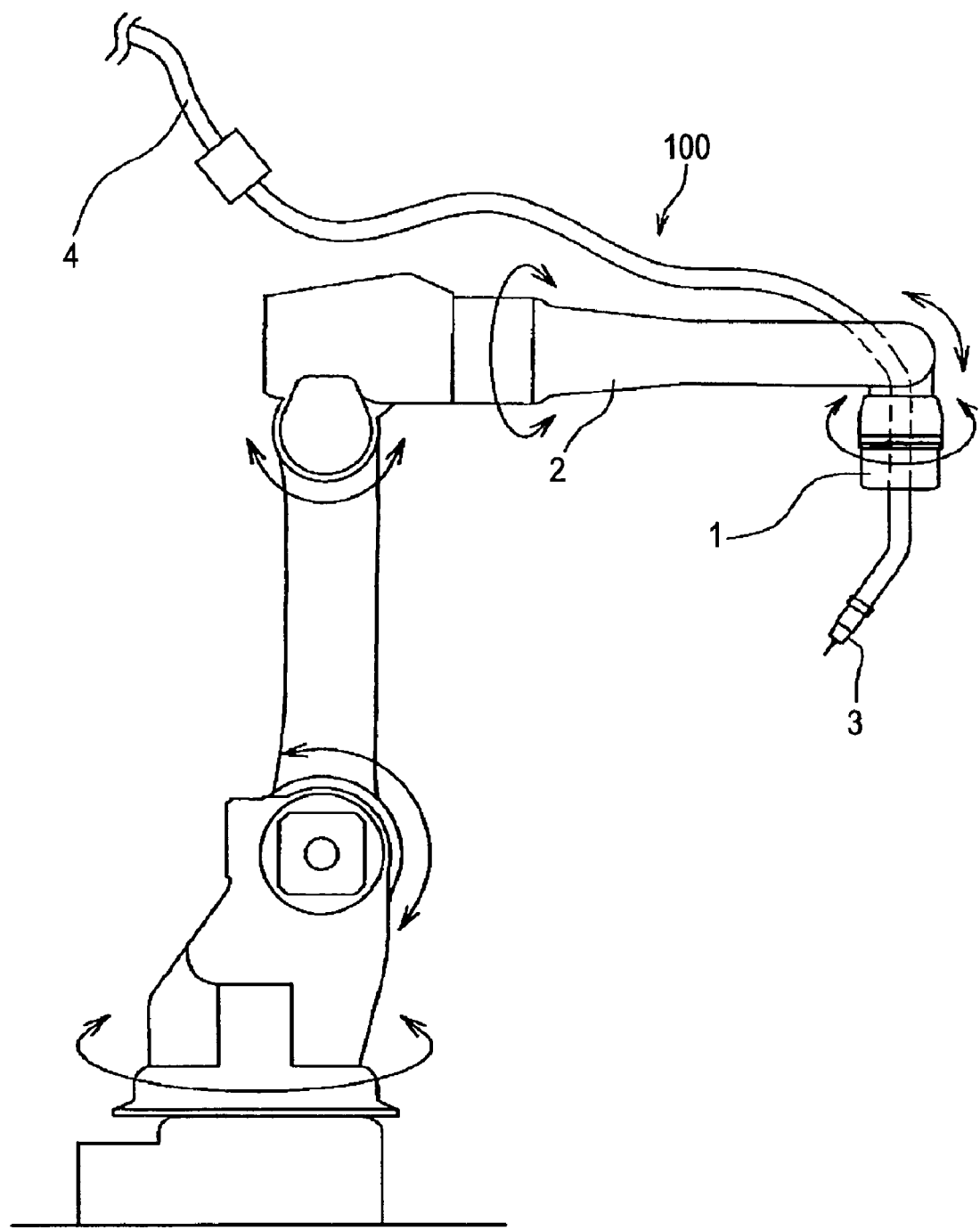
FIG. 1 is a side view showing the entirety of an industrial robot device equipped with a tool replacing device according to an embodiment of the present invention.
Figure 2:
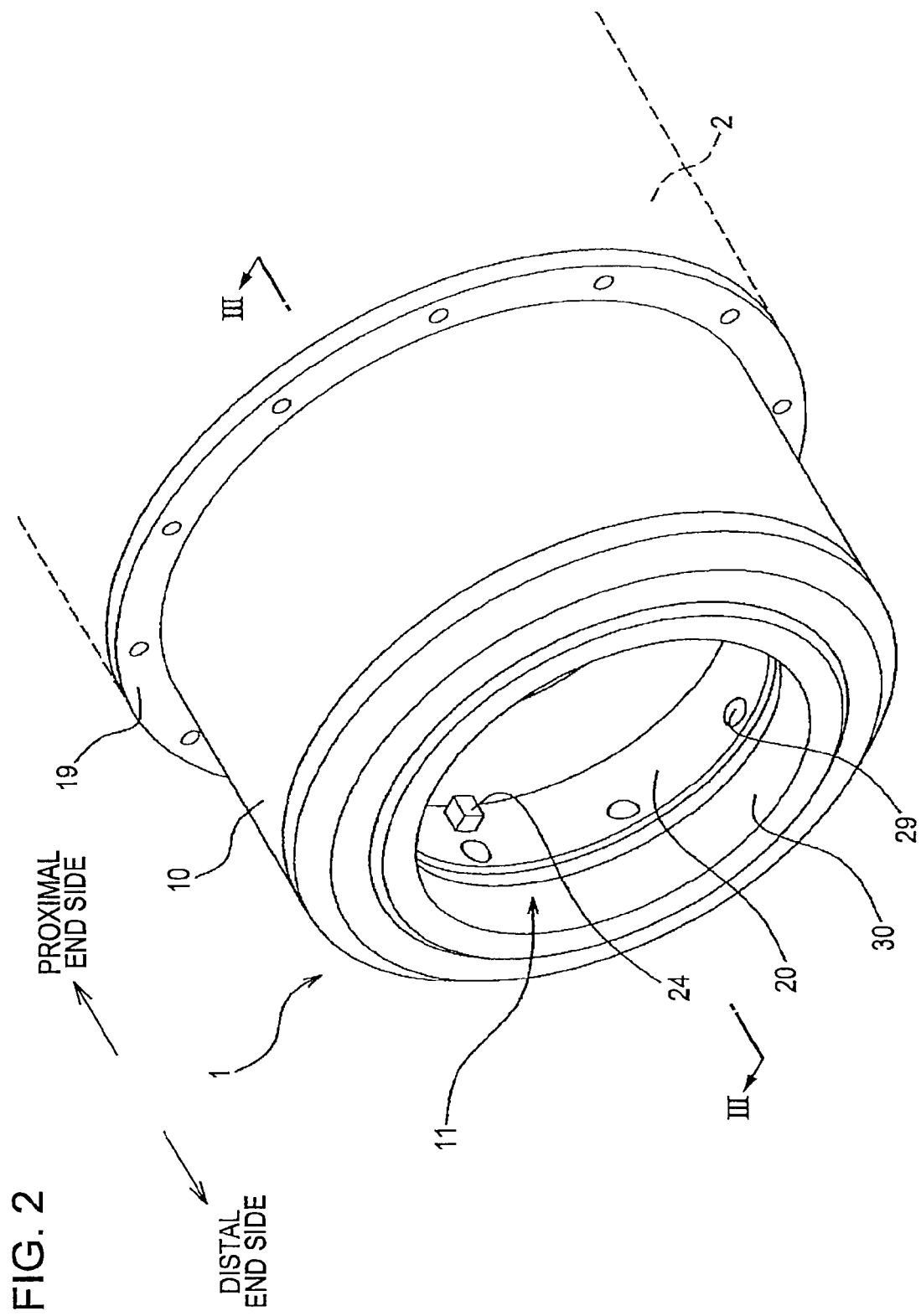
FIG. 2 is a perspective view of the entirety of a tool replacing device according to the embodiment.
Figure 3:
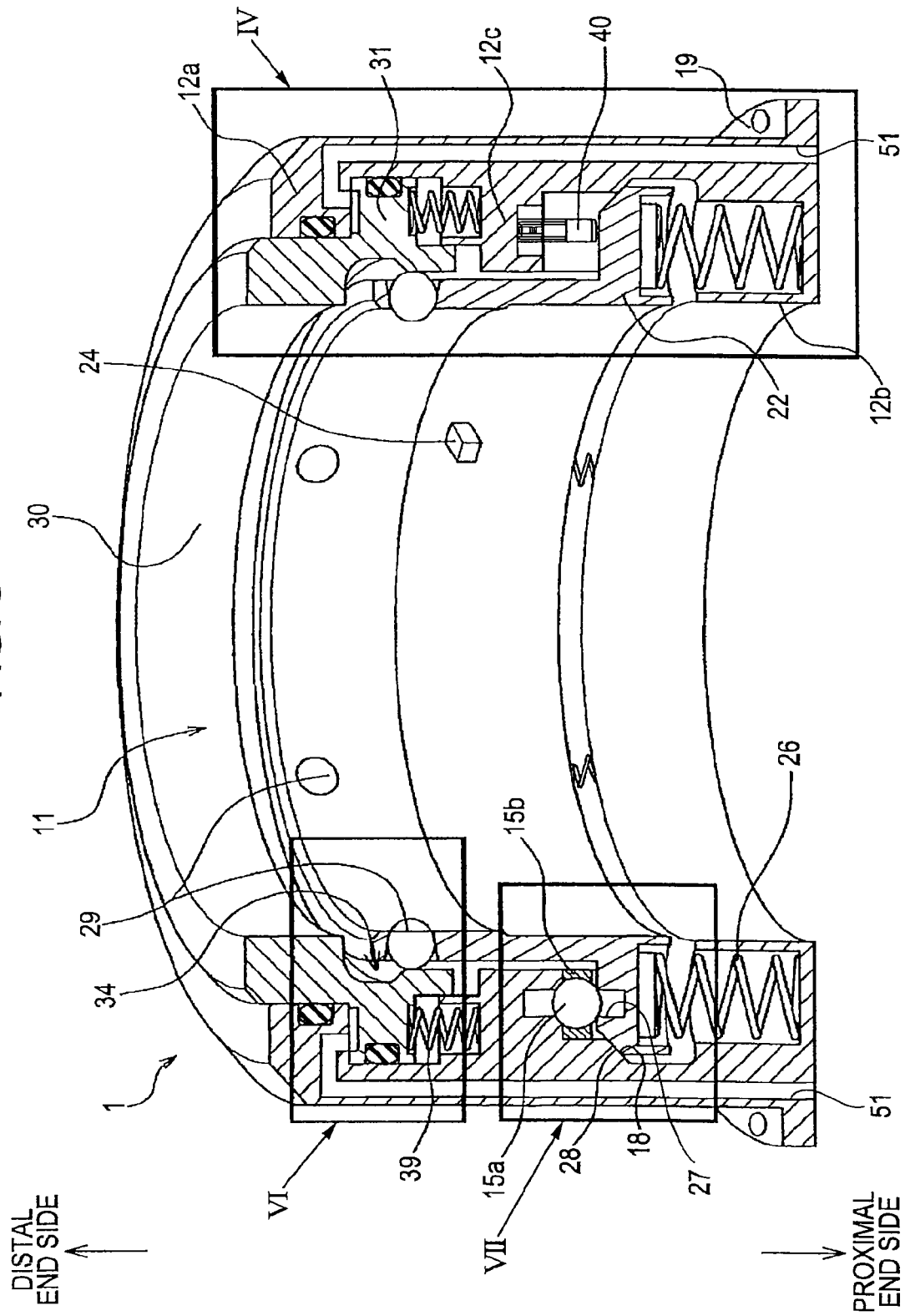
FIG. 3 is a sectional view taken away along a line III-III in the tool replacing device shown in FIG. 2.
Figure 4:
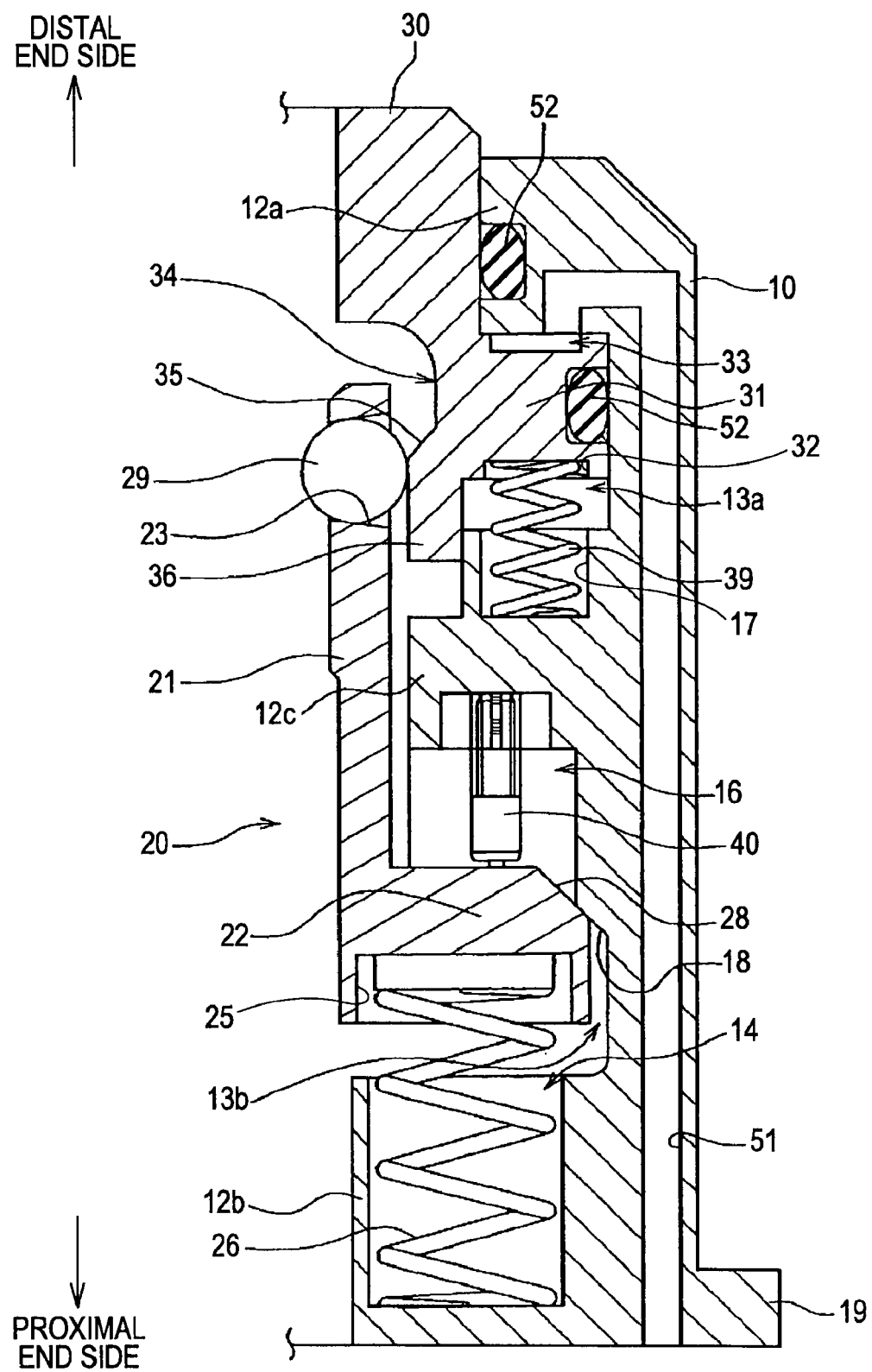
FIG. 4 is an enlarged sectional view of a part enclosed by a box IV in the tool replacing device shown in FIG. 3.
Figure 5:
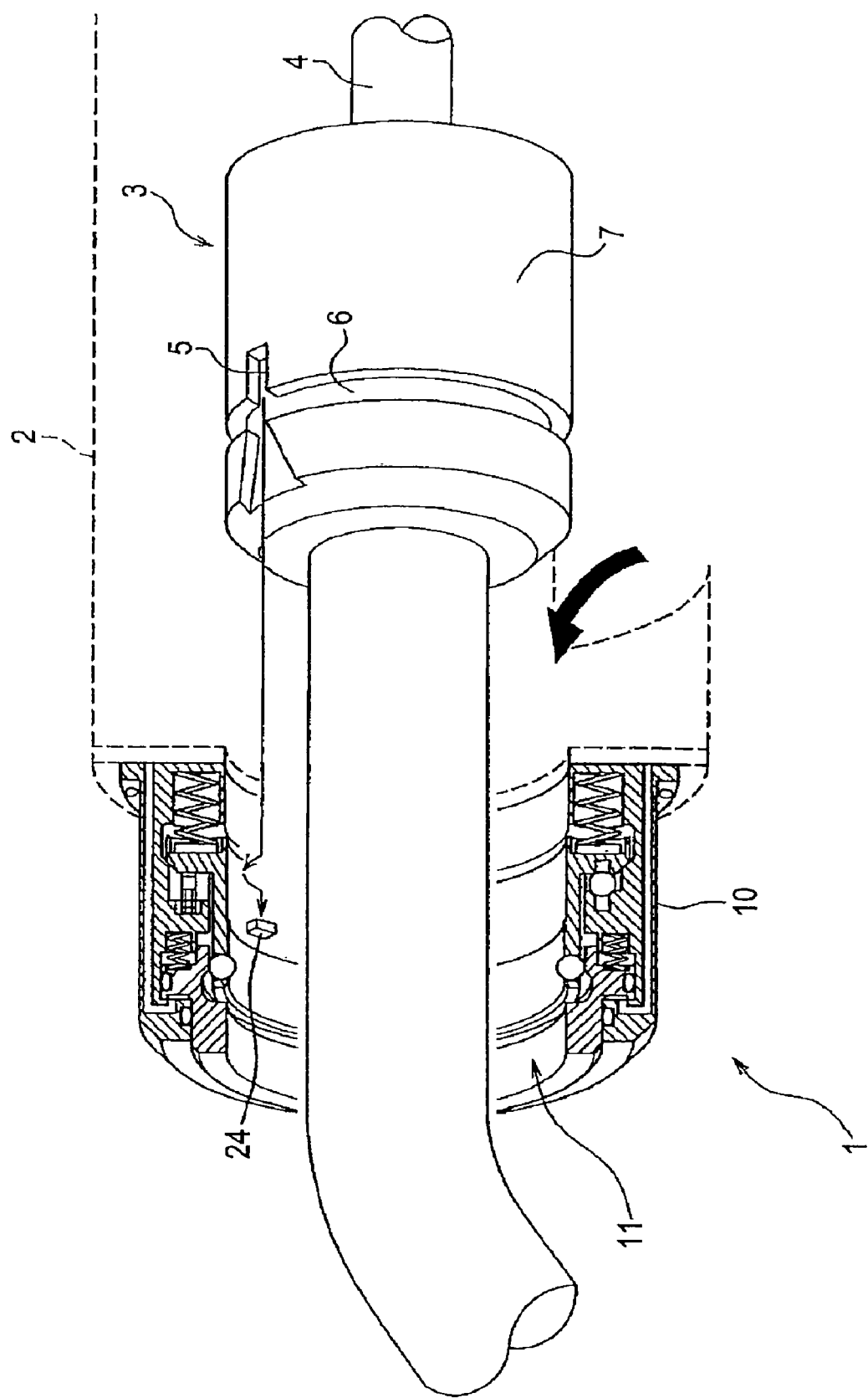
FIG. 5 is a perspective view showing a method for inserting a welding torch into the tool replacing device.

Hereinafter, the tool replacing device according to an embodiment of the present invention will be described with reference to FIGS. 1 to 7. Here, FIG. 1 is a side view of an industrial robot device holding a welding torch. FIG. 2 is a perspective view of a tool replacing device. FIG. 3 is a sectional view taken away along a line III-III in the tool replacing device shown in FIG. 2. FIG. 4 is an enlarged sectional view of a part enclosed by a box IV, in the tool replacing device shown in FIG. 3. FIG. 5 is a perspective view showing a method for inserting the welding torch into the tool replacing device. FIGS. 6A to 6D are enlarged sectional views showing processes wherein the welding torch and the tool replacing device engage with each other. FIGS. 7A to 7D are representations showing processes wherein a holding member returns to its original position.

As shown in FIG. 1, an industrial robot device 100 has a tool replacing device 1 provided at a tip portion of a robot arm 2 thereof that can freely move in six axial directions, and holds a welding torch 3 by the tool replacing device 1.

The robot arm 2 can move the welding torch 3 held at the tip portion thereof via the tool replacing device 1, to a predetermined position in a three dimensional space, by a joint portion of each arm being turned in a respective one of the arrow directions shown in FIG. 1.

The inside of the robot arm 2 is formed into a hollow shape, and a welding wire or a cable 4 is arranged through the inside thereof.

The welding torch 3 held by the tool replacing device 1 is a tool for subjecting an object to be worked to arc welding or the like. Electric power, shield gas, cooling water, and welding wire are supplied through the cable 4 inserted through the robot arm 2.

Next, the tool replacing device 1 is described with reference to FIGS. 2 to 4.

As shown in FIG. 2, the tool replacing device 1 includes a cylindrical case member 10 of which the proximal end side is fixed at a tip portion of the robot arm 2, and which has a mounting hole 11 formed from the distal end side up to the proximal end side; a cylindrical holding member 20 located inside the case member 10; and a movable member 30 located between the case member 10 and the holding member 20.

Between the holding member 20 and the movable member 30, engaging balls 29 are held so as to be projectable toward the inner peripheral side of the holding member 20, and the engaging balls 29 projects toward the inner peripheral side of the holding member 20 to thereby engage with the engaged portions of the welding torch 3 inserted into the holding member 20, whereby the welding torch 3 is held by the holding member 20.

The case member 10 has also shock sensors 40 (refer to FIG. 3) for detecting a movement of the holding member 20. The case member 10 supports the holding member 20 so as to be movable in the cylindrical axis direction by first springs 26 described later, and supports the movable member 30 so as to be movable in the cylindrical axis direction by second springs 39.

As shown in FIG. 3, the case member 10 has a substantially cylindrical shape, and the mounting hole 11 through which the tool is insertable is arranged from the distal end up to the proximal end. In the case member 10, the first extension portion 12a, the second extension portion 12b, and the third extension portion 12c that extend toward the inner diameter side are arranged along the circumferential direction. Also, a flange 19 to be mounted on the tip portion of the robot arm 2 is arranged on the proximal end of the case member 10.

As shown in FIG. 4, the first extension portion 12a is a portion extending toward the inner diameter side, of the inner peripheral surface of the case member 10, on the distal end side of the case member 10. The inner diameter of the first extension portion 12a has approximately the same size as the outer diameter on the distal end side of the movable member 30 to be described later.

At the end face on the proximal end side of the first extension portion 12a, a pressurized air supply hole 51 to be described later is arranged. The pressurized air supply hole 51 may be continuously formed along the circumferential direction, or alternatively may be constituted of holes formed at predetermined spacings along the circumferential direction.

The second extension portion 12b is a portion extending toward the inner diameter side, of the inner peripheral surface of the case member 10, on the proximal end side of the case member 10. The second circumferential direction extension portion 12b is formed continuously in the circumferential direction. The inner diameter of the first extension portion 12b is smaller than that of the holding member 20.

At an end face on the distal end of the second extension portion 12b, a plurality of first spring deep holes 14, which are grooves formed toward the proximal end side, are annularly arranged at predetermined spacings in the circumferential direction about the cylindrical axis. One end side of each of the first springs 26 is fixed to a respective one of the first spring deep hole 14. Here, for each of the first springs 26 according to the present embodiment, a coil spring is used, but a leaf spring may instead be used.

The third extension portion 12c is a portion extending toward the inner diameter continuously along the circumferential direction, of the inner peripheral surface of the case member 10, between the distal end side and the proximal end side of the case member 10. The inner diameter of the third extension portion 12c is larger than the outer diameter of a holding portion 21 of the holding member 20 to be described later.

At an end face on the distal end of the third extension portion 12c, a plurality of second spring deep holes 17, which are grooves formed toward the proximal end side, are annularly arranged about the cylindrical axis. One end side of each of the plurality of the second springs 39 is fixed to a respective one of the second spring deep holes 17. Here, for the second springs 39 according to the present embodiment, coil springs are used, but leaf springs may instead be used.

As shown in FIG. 3, at an end face on the proximal end of the third extension portion 12c, a groove is arranged along the circumferential direction. In the circumferentially formed groove, position correction balls 15a are arranged at predetermined spacings so as to be each held in a ball holding member 15b in a state wherein the position correction ball 15a projects its spherical surface toward the proximal end side. Here, the spherical surface of the position correction ball 15a is formed so as to project toward the proximal end side further than the end face on the proximal end side of the third extension portion 12c.

As shown in FIG. 4, at the end face on the proximal end of the third extension portion 12c, there are provided four shock sensor accommodation spaces 16 each accommodating a shock sensor 40 to be described latter. The four shock sensors 40 are formed at equal spacings in the circumferential direction, and the shock sensors 40 are fixed for each of the shock sensor accommodation spaces 16. These shock sensors 40 are known sensors for detecting a displacement of an object by abutting the tip portion of the shock sensor 40 against the object.

Between the first extension portion 12a and the third extension portion 12c, a movable member accommodation hole 13a, which is a groove formed toward the outer diameter side, of the inner peripheral surface of the case member 10, is arranged along the circumferential direction. The diameter of the movable member accommodation hole 13a has approximately the same diameter as the outer diameter of the fifth extension portion 31 formed in the movable member 30 to be described later.

Between the second extension portion 12b and the third extension portion 12c, a holding member accommodation hole 13b is arranged along the circumferential direction. The diameter on the proximal end side, of the holding member accommodation hole 13b is larger than the outer diameter of the fourth extension portion 22 of the holding member 20 to be described later.

On the distal end side of the holding member accommodation hole 13b, there is provided a guide surface 18 formed obliquely relative to the third extension portion 12c of the case member 10.

Next, the movable member 30 is described.

As shown in FIG. 4, the movable member 30 is a cylindrical member to be inserted into the distal end side of the case member 10, and the inner diameter thereof is formed larger than the outer diameter of the held member of the welding torch 3 so as to allow the welding torch 3 to be inserted through the movable member 30.

In the movable member 30, the fifth extension portion 31 accommodated in the movable member accommodation hole 13a is arranged along the circumferential direction. The length in the cylindrical axis direction, of the movable member accommodation hole 13a of the case member 10 is larger than the length in the cylindrical axis direction, of the fifth extension portion 31. Also, the length in the cylindrical axis direction, of the groove formed at the distal end side of the third extension portion 12c is large enough for the end face on the proximal end side of the fifth extension portion 31 to abut against the end face on the distal end side of the third extension portion 12c. Therefore, the movable member 30 is supported by the case member 10 so as to be slidable in the cylindrical axis direction of the case member 10.

In the fifth extension portion 31 of the movable member 30, second spring shallow holes 32 are arranged at predetermined spacings along the circumferential direction. Regarding each of the second springs 39, one side end thereof is fixed to the second spring deep hole 17 formed at the distal end side of the third extension portion 12c of the case member 10, and the other end thereof is fixed to a respective one of the second spring deep holes 17. The second springs 39 each has a resilient urging force large enough for the end face on the distal end side of the fifth extension portion 31 to always abut against the end face on the distal end side the first extension portion 12a of the case member 10, and is operable to resiliently urge the movable member 30 toward the distal end side at all times.

In the distal end side of inner peripheral surface of the movable member 30, a groove is arranged from the proximal end side toward the distal end side. The length in the cylindrical axis direction, of the groove large enough to allow the end face on the proximal end side of the fifth extension portion 31 to abut against the end face on the distal end side the third extension portion 12c when the movable member 30 has moved to the proximal end side under supply of pressurized air.

In the movable member 30, a pressurization chamber 33 is arranged at the end face on the distal end side of the fifth extension portion 31. The pressurization chamber 33 is formed in a space across which the pressurized air supply hole 51 formed in the end face on the proximal end side of the first extension portion 12a and the end face on the distal end side of the fifth extension portion 31 oppose each other.

Thus, since the pressurization chamber 33 is provided, when pressurized air supplied to the pressurized air supply hole 51 flows into the pressurization chamber 33, the fifth extension portion 31 moves to the proximal end side. That is, the movable member 30 moves to the proximal end side against the resilient urging force of the second spring 39.

Upon movement of the movable member 30 to the proximal end side against the resilient urging force of the second spring 39, the engaging balls 29 described later do not abut against a blocking surface 36, and are accommodated in a groove portion 34.

Here, the pressurized air to be supplied have only to be enough to allow the movable member 30 resiliently urged by the second spring 39 to move up to the proximal end side. In order to prevent the pressurized air delivered into the pressurization chamber 33 from leakage, an O-ring is provided between the case member 10 and the movable member 30.

On the inner peripheral surface of the movable member 30, the groove portion 34, an extruding surface 35, and the blocking surface 36 are arranged in this order from the distal end side toward the proximal end side.

The groove portion 34 is a groove formed from the inner peripheral surface of the movable member 30 toward the outer diameter along the circumferential direction. The blocking surface 36 is a plane located on a further inner side than the outermost radial surface of the groove portion 34. The extruding surface 35 is an inclined surface located between the groove portion 34 and the blocking surface 36. The groove portion 34 is a groove for accommodate the engaging balls 29 and preventing the engaging balls 29 from projecting from projection holes 23. The extruding surface 35 is an inclined surface for moving the engaging balls 29 located in the groove portion 34 to the projection holes 23, and for projecting parts of the engaging balls 29 from the projection holes 23. Also, the blocking surface 36 is a plane for maintaining a state wherein parts of the engaging balls 29 has been projected from the projection holes 23.

Now, the holding member 20 is described.

As shown in FIG. 4, the holding member 20 includes a substantially cylindrical holding portion 21; the fourth extension portion 22 formed along the circumferential direction and accommodated in the holding member accommodation hole 13b; and projection holes 23 from which the engaging balls 29 described later is projectable to the inner peripheral surface side.

The diameter of the holding member accommodation hole 13b of the case member 10 is larger than the outer diameter of the fourth extension portion 22, and the inner diameter of the third extension portion 12c of the case member 10 is larger than the outer diameter of the holding portion 21. The holding member 20 is supported within the case member 10. Because the inner diameter of the case member 10 is larger than the outer diameter of the holding member 20, the holding member 20 can move in the outer diameter direction (direction perpendicular to the cylindrical axis direction) within the case member 10.

The holding portion 21 has a substantially cylindrical shape, and its inner diameter is approximately the same as the outer diameter of the held member so that the tool may be inserted through the holding portion 21.

Also, the outer diameter of the holding portion 21 is smaller than the inner diameter of the third extension portion 12c located on the outer peripheral surface side of the holding portion 21, or the inner diameter of the blocking surface 36 of the movable member 30, and arranged so that a sliding surface 28 (described later) of the fourth extension portion 22 becomes abutted against the guide surface 18 formed in the holding member accommodation hole 13b.

At the end face on the proximal end side of the fourth extension portion 22, there is provided a first spring shallow hole 25. Regarding each of the first springs 26, one side end thereof is fixed to the first spring deep hole 14 of the second extension portion 12b of the case member 10, and the other end thereof is fixed to the first spring shallow hole 25 via engineered plastic for fixing the first spring 26.

Each of the first springs 26 always serve as a resilient urging force enough to allow the end face on the distal end side of the fourth extension portion 22 to abut against the end face on the distal end side of the third extension portion 12c of the case member 10.

Thus, the holding member 20 is always resiliently urged toward the distal end side along circumferential direction, by the plurality of first springs 26 provided in the case member 10, and enters into a state wherein the end face on the distal end side of the fourth extension portion 22 becomes always abutted against the end face on the proximal end side of the third extension portion 12c of the case member 10.

When the holding member 20, after having moved to the proximal end side, returns to the distal end side by the resilient urging force of the first springs 26, if the holding member 20 is deviated to the redial direction of the cylindrical shaft, the sliding surface 28 of the fourth extension portion 22 moves to the distal end side along the guide surface 18 of the case member 10, whereby the deviation of the holding member 20 toward the redial direction of the cylindrical shaft is corrected.

Also, at the distal end side of the fourth extension portion 22 that has been resiliently urged toward the proximal end side by the first springs 26, there is provided a position correction groove 27, so that the position correction groove 27 and the position correction ball 15a formed projectedly from the end face on the proximal end side of the third extension portion 12c of the case member 10 engage with each other, whereby the deviation of the holding member 20 in circumferential direction of the cylindrical shaft is corrected.

The shock sensors 40 accommodated in the shock sensor accommodation spaces 16 in the case member 10 are installed so that the tip portions of the shock sensors 40 abut against the end face on the distal end side of the fourth extension portion 22. Therefore, when the welding torch 3 held by the holding member 20 makes contact with an external member and the holding member 20 moves to the proximal end side, the tip portions of the shock sensors 40 detect the movement of the holding member 20.

At the end face on the distal end side of the fourth extension portion 22, a sliding surface 28 constituting an inclined surface is provided, and abuts against the guide surface 18 of the case member 10.

As shown in FIG. 4, the projection holes 23 of the holding portion 21 are arranged at predetermined spacings along the circumferential direction. The vertical position of each of the projection holes 23 is located at a position opposite to the blocking surface 36 of the movable member 30 in a state wherein the end face on the distal end side of the fourth extension portion 22 abuts against the end face on the proximal end side of the third extension portion 12c of the case member 10, and wherein the end face on the distal end side of the fifth extension portion 31 of the movable member 30 abuts against the end face on the proximal end side of the first extension portion 12a of the case member 10 (this state is hereinafter referred to as an "ordinary state").

The projection holes 23 are each formed by being bored so as to gradually increase in its diameter from the inner peripheral surface of the holding portion 21 toward the outer peripheral surface thereof. The diameter of the projection hole 23 on the inner peripheral surface side is smaller than that of the engaging ball 29 to be inserted into the projection hole 23, while the diameter of the projection hole 23 on the inner peripheral surface side is larger than that of the engaging ball 29.

The engaging balls 29 are each disposed between the projection hole 23; and the groove portion 34, the extruding surface 35, and the blocking surface 36. Each of the engaging balls 29 is formed to have a diameter such that the engagement ball 29 fits in the projection hole 23 and that it projects toward the inner peripheral surface side of the holding portion 21, in a state wherein the engaging ball 29 is engaged with the blocking surface 36 located on the outer peripheral surface side of the holding portion 21. Meanwhile, for a material of the engaging balls 29, for example, a hard member such as a steel member is used, but the material of the engaging balls 29 is not limited thereto.

Thus, in the ordinary state (state wherein air is not supplied), the engaged portions of the welding torch 3 inserted through the holding portion 21, and the engaging balls 29 projecting toward the inner peripheral surface side of the holding portion 21 can be engaged with each other.

Since the engaging balls 29 abut against the blocking surface 36 of the movable member 30, they do not move toward the outer diameter direction of the holding portion 21, which allows the maintenance of the engagement state between the engaging balls 29 and the engaged portions of the welding torch 3.

In a state wherein the welding torch 3 is not inserted through the holding portion 21, since the diameter on the inner peripheral surface side, of the projection hole 23 is smaller than that of the engaging ball 29, the engaging ball 29 does not fall off toward the inner peripheral surface side of the holding portion 21.

When the pressurization chamber 33 of the movable member 30 is supplied with pressurized air and so the movable member 30 moves toward the proximal end side against the second spring 39, the groove portion 34 of the movable member 30 becomes located on the outer peripheral surface side of the projection holes 23 formed in the holding portion 21, so that the engaging balls 29 supported within the projection holes 23 can move to the groove portion 34. Also, since the groove portion 34 is a groove formed to project toward the outer diameter side by an amount corresponding to a projection amount of the engaging ball 29 from the projection hole 23 of the holding member 20 toward the inner peripheral surface side of the holding member 20, there is no possibility that the engaging balls 29 that have moved inside the groove portion 34 may project toward the inner peripheral surface side of the holding member 20.

Next, description is made of procedures for mounting the welding torch 3 to the industrial robot device 100 equipped with the tool replacing device 1 according to the present embodiment.

The tool replacing device 1 includes a type to which the welding torch 3 serving as a tool is mounted by inserting from the mounting hole 11 at the distal end side of the tool replacing device 1, and a type in which the welding torch 3 is accommodated from a mounting hole formed at the robot arm 2 on the proximal end side of the tool replacing device 1 and which is installed from the proximal end side of the tool replacing device 1 toward the distal end side thereof.

As shown in FIG. 5, the welding torch 3 includes a substantially cylindrical held member 7 held by the tool replacing device 1; a groove portion 5 formed from the proximal end side on the outer periphery of the held member 7 toward distal end side thereon; a locked portion 6 that is a groove formed along a circumferential direction on the outer peripheral surface of the held member 7; and a cable 4 wired from the end face on the proximal end side of the held member 7 up to a cable feeder.

In the case of the type that mounts the welding torch 3 from the proximal end side of the tool replacing device 1 toward the distal end side thereof, as shown in FIG. 5, the tip portion of the welding torch 3 is inserted into a hole formed in the robot arm 2. In this case, the welding torch 3 is inserted so that the groove portion 5 of the welding torch 3 engages with a projecting portion 24 formed on the inner peripheral surface of the tool replacing device 1.

On the other hand, in the case of the type to which the welding torch 3 is mounted by inserting from the mounting hole 11 on the distal end side of the tool replacing device 1, the proximal end side of the welding torch 3 is inserted into the mounting hole 11 of the tool replacing device 1, with the cable 4 once disconnected from the cable feeder. Then, the cable 4 is inserted through the robot arm 2 and connected to the cable feeder.

Now, with reference to FIGS. 6A to 6D, description is made of a process wherein the held member 7 of the welding torch 3 and the holding member 20 of the tool replacing device 1 are engaged with each other. Here, FIGS. 6A to 6D are enlarged sectional views of a part enclosed by a box VI in the tool replacing device shown in FIG. 3.

Figure 6A:
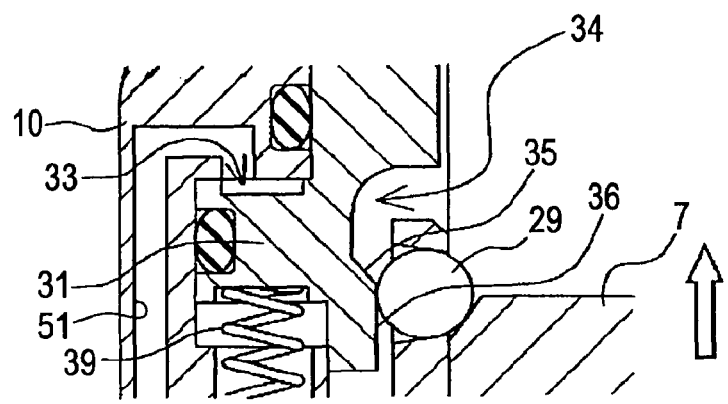
FIGS. 6A to 6D are enlarged sectional views showing engaging processes between a held member and a holding member of the welding torch.

As shown in FIG. 6A, in a state wherein the pressurization chamber 33 is not provided with pressurized air, since the engaging ball 29 projects toward the inner peripheral surface side of the holding member 20, the held member 7 of the welding torch 3 interferes with the engaging ball 29, so that the welding torch 3 cannot be inserted into the holding member 20.

Figure 6B:
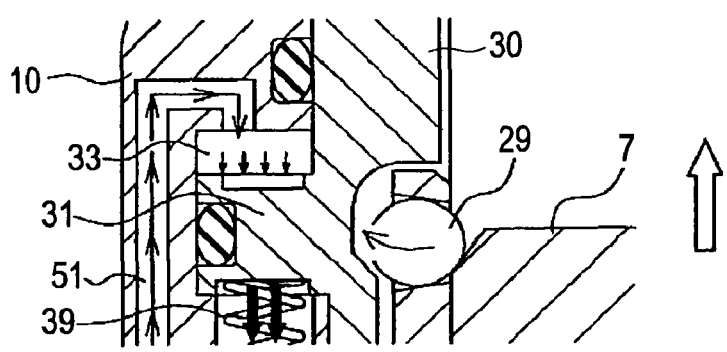

Therefore, as shown in FIG. 6B, when the welding torch 3 is to be inserted into the holding member 20, pressurized air is supplied into the pressurized air supply hole 51. Upon supply of the pressurized air into the pressurization chamber 33, the fifth extension portion 31 of the movable member 30 is pressed by the pressurized air toward the proximal end side, and the movable member 30 moves toward the proximal end side against the second spring 39.

Thereupon, the engaging ball 29 is pushed outside the holding member 20 by the held member 7 of the welding torch 3 inserted into the holding member 20, and starts moving into the groove portion 34. Furthermore, when the held member 7 of the welding torch 3 moves toward the proximal end side, the engaging ball 29 gets into the groove portion 34 to thereby enter into a state of being non-projecting from the inner peripheral surface of the holding member 20, so that it does not hinder the insertion of the held member 7.

Figure 6C:
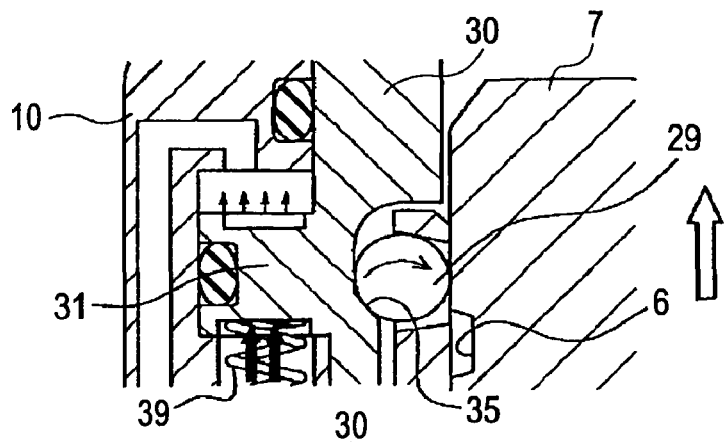

As shown in FIG. 6C, if the supply of pressurized air is stopped in a state wherein the held member 7 of the welding torch 3 is inserted into the holding member 20, the second spring 39 resiliently urges the movable member 30 toward the distal end side, so that the engaging ball 29 is pushed out by the extruding surface 35 toward the inner peripheral surface side of the holding member 20.

Figure 6D:
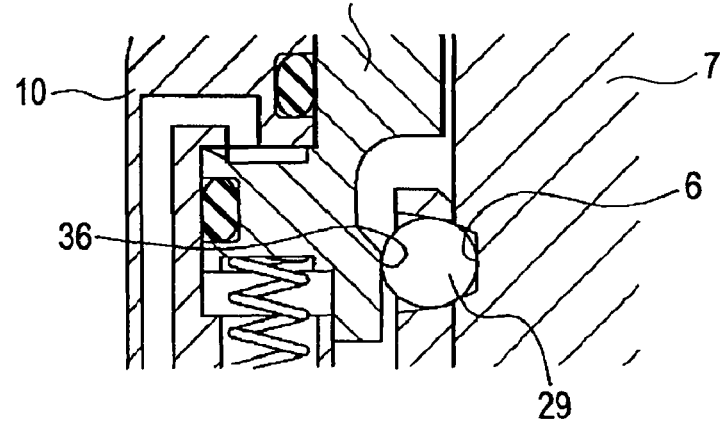

Thereupon, as shown in FIG. 6D, the engaging ball 29 pushed out by the extruding surface 35 projects into the locked portion 6 formed in the held member 7 of the welding torch 3, and engages with the locked portion 6, whereby the welding torch 3 is held by the holding member 20. Also, in the state of engaging with the locked portion 6, the engaging balls 29 abuts against the blocking surface 36 and cannot move toward the outer peripheral surface side of the holding member 20.

By the above-described processes, the held member 7 of the welding torch 3 is held in the holding member 20, and the welding torch 3 is mounted to the tool replacing device 1.

Next, description is made of states wherein the welding torch 3 makes contact with an external member such as an object to be worked. The holding member 20 holding the welding torch 3 moves toward the proximal end side under shock at the time of contact.

Figure 7A:
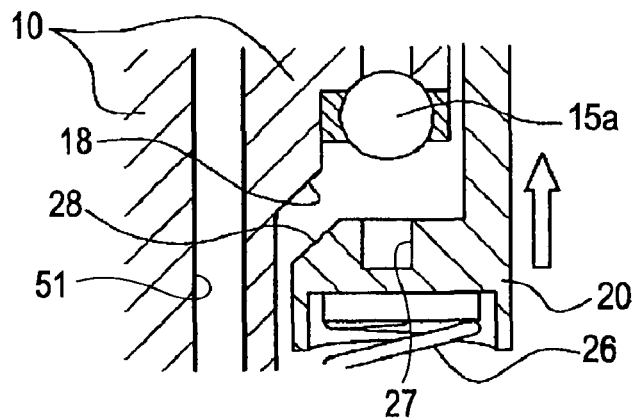
FIGS. 7A to 7D are representations showing processes wherein the holding member returns to its original position.

FIGS. 7A to 7D are enlarged sectional views of a part enclosed by a box VII in the tool replacing device shown in FIG. 3. The holding member 20 that has moved to the proximal end side as described above is resiliently urged by the first spring 26 toward the distal end side as shown in FIG. 7A.

Figure 7B:
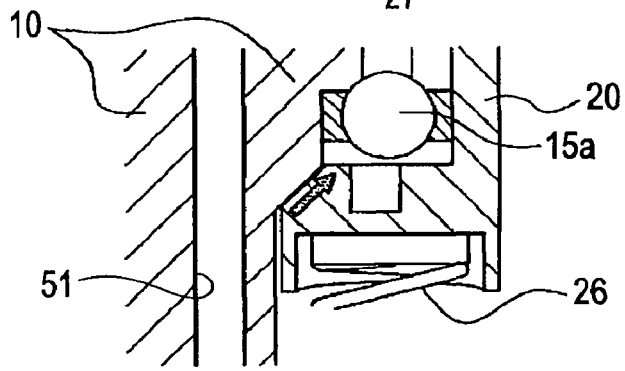

The holding member 20 may move not only in the axial direction but also in the radial direction. FIG. 7B shows the case wherein the holding member 20 has deviated in the radial direction. In this case, the sliding surface 28 of the holding member 20 abuts against the guide surface 18 of the case member 10. The holding member 20 resiliently urged by the first spring 26 moves to the distal end side while correcting the radial deviation along the guide surface 18.

Figure 7C:
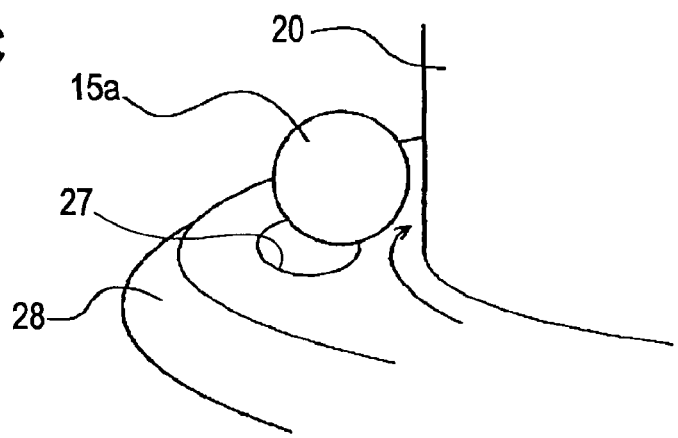

However, even if the holding member 20 returns to the original position along the guide surface 18, there is a possibility that the holding member 20 may deviate in the circumferential direction as shown in FIG. 7C.

Figure 7D:
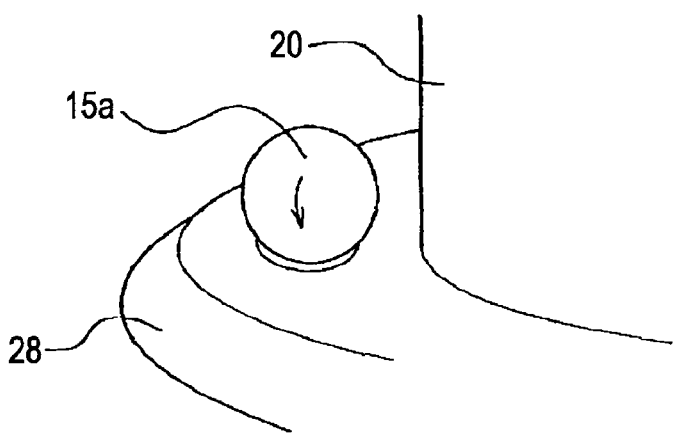

In this case, the distal end side of the position correction groove 27 formed in the holding member 20 abuts against the position correction ball 15a of the case member 10. The distal end side of the position correction groove 27 slides on the surface of the position correction ball 15a having a spherical shape, and the spherical surface of the position correction ball 15a fits into the position correction groove 27. Thus, as shown in FIG. 7D, the holding member 20 corrects the positional deviation in the circumferential direction, and can return to the original position.

As shown in FIG. 4, the tip portion of the shock sensor 40 is mounted in a state of abutting against the fourth extension portion 22 of the holding member 20, and therefore, when the welding torch 3 makes contact with the tip portion of the shock sensor 40, the shock sensor 40 detects that the holding member 20 has moved toward the proximal end side. Therefore, the shock sensor 40 can determine that the welding torch 3 is in unwanted contact with another member. Hence, operations of the robot arm 2 can be stopped by a signal from the shock sensor 40. In the present embodiment, four shock sensors 40 are equidistantly installed along the circumferential direction of the case member 10, and so the four sensors detects in which direction and how much the holding member 20 has moved, whereby the sensors can detect movements of the holding member 20 in the case member 10 toward the radial direction and the circumferential direction, in addition to movement of the holding member 20 toward the proximal end side.

Also, as shown in FIG. 6D, the holding member 20 abuts against the blocking surface 36 of the movable member 30 and cannot move toward the radial direction, and therefore, even if power supply is stopped during welding operation due to electric outage, there is no possibility that the welding torch 3 may drop off the tool replacing device 1.

As described above, according to the tool replacing device in the present embodiment, tools such as the welding torch can be held in the tool replacing device, and are located on the axial line in the longitudinal direction of the robot arm. This can solve the problem of impairing the accuracy of operation of the robot arm. Furthermore, since the tool held by the holding member does not drop off the holding member unless pressurized air is supplied, the tool does not drops off the tool replacing device 1 even if power supply is stopped.

Next, a tool replacing device 101 as a modification of the present invention is shown in FIG. 8. The difference between the tool replacing device 101 and the tool replacing device 1 is as follows: in the above-described tool replacing device 1, the holding member 20 is disposed inside the case member 10, while in the modification shown in FIG. 8, a holding member 120 is disposed outside a case member 110, and a movable member 130 is mounted inside the holding member 120, as well as a pressurized air supply hole 151 is provided.

The case member 110 has a cylindrical shape, and on a distal end side and a proximal end side on its cylindrical outer peripheral surface, there are provided a first extension portion 111 and a second extension portion 112 that extend toward the outer diameter direction.

On the proximal end side of the holding member 120, a third extension portion 121 extending toward the inner diameter side is arranged, and the third extension portion 121 is located between the first extension portion 111 and the second extension portion 112 that are arranged on the outer peripheral surface.

On the distal end side of the holding member 120, a fourth extension portion 122 extending toward the inner diameter side is arranged, and a fifth extension portion 123 extending toward the inner diameter side is arranged between the fourth extension portion 122 and the third extension portion 121 that is arranged on the proximal end side.

In the movable member 130, a sixth extension portion 131 extending toward the outer diameter direction is arranged, and is located between the fourth extension portion 122 and the fifth extension portion 123.

A first spring 126 is arranged between an end face on the distal end side of the second extension portion 112 of the case member 110 and an end face on the proximal end side of the third extension portion 121 of the holding member 120. This makes the first spring 126 more prone to move, and makes an inertial force during the time from when the tool replacing device 101 collides against an object until when it stops more prone to be dispersed.

Between the end face on the distal end side of the fifth extension portion 123 of the holding member 120 and the end face on the proximal end side of the sixth extension portion 131 of the movable member 130, there is provided a second spring 139, and the movable member 130 is supported inside the holding member 120 so as to be movable in the cylindrical axis direction. In the proximal end side of the fourth extension portion 122 of the holding member 120, the pressurized air supply hole 151 is provided.

On the end face on the inner diameter side of the fifth extension portion 123 of the holding member 120, a seven extension portion 124 extending toward the distal end side is arranged, and engaging balls 129 to engage with engaged portions of the welding torch 3 are supported on the seventh extension portion 124. The movable member 130 includes, on its inner peripheral surface side, a groove portion 134 for accommodating the engaging balls 129; an extruding surface 135 for projecting the engaging balls 129 toward the inner peripheral surface side of the holding member 120; and a blocking surface 136 for maintaining the state wherein the engaging balls 129 have projected toward the inner peripheral surface side of the holding member 120.

While not shown, shock censors are arranged between the end face on the distal end side of the second extension portion 112 of the case member 110 and the holding member 120. Thereby, when the shock sensors (not shown) detect a movement of the holding member 120, it can determine that the welding torch 3 held by the holding member 120 is in contact with an external member.

What is claimed is:

1. A tool replacing device wherein a mounting hole for a tool is provided on its distal end side from which the tool is inserted, and wherein its proximal end side is mounted to a tip portion of a robot arm, the tool replacing device comprising:
   a substantially cylindrical case member having a first extension portion, a second extension portion, and a third extension portion that extend toward an inner diameter side of the tool replacing device, and that are located on the distal end side, the proximal end side, and between the distal end side and the proximal end side, respectively;
   a substantially cylindrical holding member located inside the case member, and having a fourth extension portion that extends toward an inner peripheral surface of the case member between the second extension portion and the third extension portion; and
   a substantially cylindrical movable member located on the distal side of the holding member, and supported between the holding member and the case member, the movable member having a fifth extension portion extending toward the inner peripheral surface of the case member between the first extension portion and the third extension portion,
   wherein the case member supports the holding member between the second extension portion and the fourth extension portion via a first elastic member so as to be movable in a cylindrical axis direction of the case member, and supports the movable member so as to be movable in the cylindrical axis direction of the case member, between the third extension portion and the fifth extension portion via a second elastic member, the case member including:
      a shock sensor that is located at an end face on the proximal end side of the third extension portion, and that detects a movement of the holding member by abutting against the fourth extension portion; and
      a fluid supply hole for supplying a fluid to an end face on the distal end side of the fifth extension portion, and moving the movable member toward a direction opposite to a direction of a resilient urging force of the second elastic member, the fluid supply hole being located at an end face on the proximal end side of the first extension portion;
   wherein the holding member includes a projection hole formed so that an engaging ball held between the movable member and the holding member is projectable toward an inner peripheral surface side of the holding member; and
   wherein the movable member includes:
      an extruding surface that projects the engaging ball from the projection hole toward the inner peripheral surface side of the holding member by the end face on the distal end side of the fifth extension portion resiliently urged by the second elastic member abutting against an inner peripheral surface of the movable member, opposite to the engaging ball when the end face on the distal end side of the fifth extension portion abuts against the end face on the proximal end side of the first extension portion; and
      a groove portion for accommodating the engaging ball that has moved from the projection hole to the inner peripheral side of the movable member when the fifth extension portion has been pressed against the resilient urging force of the second elastic member by the fluid supplied through the fluid supply hole and the movable member has moved to the proximal end side, the groove portion being located in the inner peripheral surface of the movable member, opposite to the engaging ball.

2. A tool replacing device wherein a mounting hole for a tool is provided on its distal end side from which the tool is inserted, and wherein its proximal end side is mounted to a tip portion of a robot arm, the tool replacing device comprising:
   a substantially cylindrical case member having a first extension portion and a second extension portion that extend toward an outer diameter direction of the tool replacing device, and that are located on the distal end side and the proximal end side, respectively;
   a substantially cylindrical holding member located on a distal end side of the case member, the holding member including:
      a third extension portion of which a proximal end side extends toward an inner diameter side of the tool replacing device, and which is located between the first extension portion and the second extension portion of the case member;
      a fourth extension portion of which a distal end side extends toward the inner diameter side;
      a fifth extension portion extending toward the inner diameter side, between the third extension portion and the fourth extension portion; and
   a movable member located inside the holding member, and having a sixth extension portion that extends toward an outer diameter side of the tool replacing device, between its distal end side and proximal end side, and that is located between the fourth extension portion and the fifth extension portion,
   wherein the case member supports the holding member between the second extension portion and the third extension portion via a first elastic member so as to be movable in a cylindrical axis direction of the case member, and has a shock sensor that is located at an end face on the distal end side of the second extension portion and that detects a movement of the holding member by abutting against an end face on the proximal end side of the third extension portion of the holding member moving in the cylindrical axis direction;
   wherein the holding member supports the movable member between the fifth extension portion and the sixth extension portion via a second elastic member so as to be movable in the cylindrical axis direction of the holding member, the holding member includes:
      a fluid supply hole for supplying a fluid to an end face on the distal end side of the sixth extension portion, and moving the movable member toward a direction opposite to a direction of a resilient urging force of the second elastic member, the fluid supply hole being located at an end face on the proximal end side of the fourth extension portion;
      a seventh extension portion extending from an end face on the inner diameter side of the fifth extension portion toward the distal end side; and
      a projection hole formed so that an engaging ball held between the movable member and the holding member is projectable toward an inner peripheral surface side of the holding member; and
   wherein the movable member includes:
      an extruding surface that projects the engaging ball from the projection hole toward the inner peripheral surface side of the holding member by the end face on the distal end side of the sixth extension portion resiliently urged by the second elastic member abutting against the inner peripheral surface of the movable member, opposite to the engaging ball when the end face on the distal end side of the sixth extension portion abuts against the end face on the proximal end side of the fourth extension portion; and a groove portion for accommodating the engaging ball that has moved from the projection hole to the inner peripheral side of the movable member when the sixth extension portion has been pressed against the resilient urging force of the second elastic member by the fluid supplied through the fluid supply hole and the movable member has moved to the proximal end side, the groove portion being located in the inner peripheral surface of the movable member, opposite to the engaging ball.

3. The tool replacing device according to claim 1, wherein the first elastic member and the second elastic member are each a spring; and wherein the springs are arranged along the circumferential direction of the case member at a determined spacing.

4. The tool replacing device according to claim 2, wherein the first elastic member and the second elastic member are each a spring; and wherein the springs are arranged along the circumferential direction of the case member at a determined spacing.

* * * * *